US012603983B2

(12) United States Patent
Park et al.

(10) Patent No.: US 12,603,983 B2
(45) Date of Patent: Apr. 14, 2026

(54) APPARATUS AND METHOD FOR GENERATING OBJECT-BASED STEREOSCOPIC IMAGES

(71) Applicant: Electronics and Telecommunications Research Institute, Daejeon (KR)

(72) Inventors: Seongjin Park, Daejeon (KR); Do Hyung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 19/010,361

(22) Filed: Jan. 6, 2025

(65) Prior Publication Data

US 2025/0247514 A1 Jul. 31, 2025

(30) Foreign Application Priority Data

Jan. 29, 2024 (KR) ......................... 10-2024-0013373

(51) Int. Cl.
*H04N 13/282* (2018.01)
(52) U.S. Cl.
CPC ................................. *H04N 13/282* (2018.05)
(58) Field of Classification Search
CPC ........ H04N 19/30; H04N 19/33; H04N 19/12; H04N 19/124; H04N 19/136; H04N 19/154; H04N 19/176; H04N 19/18; H04N 19/184; H04N 19/34
USPC .......................................................... 349/49
See application file for complete search history.

(56) References Cited

U.S. PATENT DOCUMENTS

| | | | |
|---|---|---|---|
| 11,614,631 B1 | 3/2023 | Noui et al. | |
| 2013/0128068 A1* | 5/2013 | Georgiev | H04N 23/951 |
| | | | 348/222.1 |
| 2014/0285484 A1 | 9/2014 | Kim et al. | |
| 2018/0288307 A1* | 10/2018 | Allie | G06F 3/16 |
| 2019/0355147 A1* | 11/2019 | Li | G06V 10/17 |
| 2019/0392632 A1* | 12/2019 | Han | G06T 17/00 |
| 2021/0006831 A1 | 1/2021 | Lee et al. | |
| 2023/0359061 A1 | 11/2023 | Won et al. | |

FOREIGN PATENT DOCUMENTS

| | | |
|---|---|---|
| KR | 10-2013-0088282 A | 8/2013 |
| KR | 10-2018-0069312 A | 6/2018 |
| KR | 10-2023-0155299 A | 11/2023 |

OTHER PUBLICATIONS

Wu, Wanmin, et al. "Content-adaptive focus configuration for near-eye multi-focal displays." *2016 IEEE International Conference on Multimedia and EXPO (ICME)*. IEEE, 2016.

(Continued)

*Primary Examiner* — Masum Billah
(74) *Attorney, Agent, or Firm* — NSIP Law

(57) ABSTRACT

According to an embodiment of the present disclosure, a method of generating a stereoscopic video includes: obtaining video data; extracting at least one multiple viewpoint video data from the video data; identifying an object associated with the video data; generating tracking information for the object based on the at least one multiple viewpoint video data; and performing rendering on the object based on a depth value corresponding to the tracking information.

12 Claims, 5 Drawing Sheets

(56)  References Cited

OTHER PUBLICATIONS

Son, W. H., et al., "Plenoptic Image Processing Technology Trends", Electronics and Telecommunications Trends, 2016, (12 Pages in English, 12 Pages in Korean).

Korean Office Action Issued on Sep. 23, 2025, in Counterpart Korean Patent Application No. 10-2024-0013373 (5 Pages in English, 5 Pages in Korean).

* cited by examiner

APPARATUS AND METHOD FOR GENERATING OBJECT-BASED STEREOSCOPIC IMAGES

CROSS REFERENCE TO RELATED APPLICATION

The present application claims priority to a KR application 10-2024-0013373, filed Jan. 29, 2024, the entire contents of which are incorporated herein for all purposes by this reference.

BACKGROUND OF THE INVENTION

The present disclosure relates to techniques for generating object-based stereoscopic images, and more particularly to techniques for generating stereoscopic images for providing optimal stereoscopic effects in stereoscopic image displays with limited stereoscopic spatial representation capabilities.

DESCRIPTION OF THE RELATED ART

In order for users to enjoy immersive content, they largely use personalized displays such as head mounted displays (HMDs) or Sony's SRD, or general-purpose displays such as looking glass. In the case of personalized displays, left and right videos are created and output in binary viewpoints, respectively, and in the case of general-purpose displays, a video of multiple viewpoints is created according to the characteristics of the display and displayed on the display through the muxing process, so that the user can feel three-dimensional. In the case of personalized displays, the location of the left and right videos is initially used by the user to make the user feel less heterogeneous or to make the user feel desired, and in the case of general-purpose displays, it is designed to focus at a certain point according to the characteristics of the display where the display is made. Usually, objects are popped out to maximize the stereoscopic effect, and content is created so that the focus of the protruding part is just right. However, in some cases, the user may want to focus while automatically following the desired object. In this case, in the case of personalization, since the initial value is used as it is, if the desired object moves back and forth, the three-dimensional feeling is less felt. In addition, in the case of a general-purpose display, since it allows a three-dimensional effect to be felt at a preset value at the place where the content is produced, the range of feeling a three-dimensional effect is set. Therefore, it is difficult to respond to both personalized and general-purpose displays when a user wants to adjust a part that feels a three-dimensional effect while enjoying the content.

SUMMARY

An object of the present disclosure is to provide a device and method for automatically focusing on a desired object in order to feel a three-dimensional effect or increase clarity around a desired object while a user enjoys immersive content.

A method of operating a stereoscopic video generating device according to an embodiment of the present disclosure includes: obtain video data; extracting at least one multiple viewpoint video data from the video data; identifying an object associated with the video data; generating tracking information for the object based on the at least one multiple viewpoint video data; and performing rendering on the object based on a depth value corresponding to the tracking information.

Additionally, the video data includes plenoptic video data containing color information for multiple views.

Additionally, it includes creating a local stack corresponding to each frame of the video data using Plenoptic's refocus technology, and extracting at least one multiple viewpoint video data based on the local stack.

Additionally, by applying a predetermined tracking algorithm to the at least one multiple viewpoint video data, it includes identifying multiple viewpoint videos in which the object is clearly displayed among the at least one multiple viewpoint video data.

Additionally, the at least one multiple viewpoint video data corresponds to at least one local video included in the focal stack extracted from the plenoptic video.

Additionally, it also includes obtaining designated object information according to the user's selection.

Additionally, it also includes identifying the type of display in which the object is output; and selecting a rendering method for the object based on the type.

Additionally, if the type is a personalized display, it includes rendering left and right binary viewpoint videos, and if the type is a general-purpose display, it includes rendering multiple viewpoint videos.

A stereoscopic video generating device according to an embodiment of the present disclosure includes a camera that receives video data; a processor that generates an output video using the video data; and a display that outputs the output video; the processor obtains the video data, extracts at least one multiple viewpoint video data from the video data, identifies an object associated with the video data, generates tracking information for the object based on the at least one multiple viewpoint video data; and generates the output video by rendering the object based on a depth value corresponding to the tracking information.

Additionally, the video data includes plenoptic video data containing color information for multiple views.

Additionally, the processor creates a local stack corresponding to each frame of the video data using the refocus technology of the video data, and extracts at least one of the multiple viewpoint video data based on the local stack.

Additionally, the processor identifies multiple viewpoint videos in which the object is clearly displayed among the at least one multiple viewpoint video data by applying a predetermined tracking algorithm to the at least one multiple viewpoint video data.

Additionally, the at least one multiple viewpoint video data corresponds to at least one local video included in the local stack extracted from the plenoptic video data.

Additionally, the processor obtains the designated object information according to the user's selection and identifies the object related to the video data.

Additionally, the processor identifies the type of display in which the object is output, selects the rendering method for the object based on the type, and renders the object based on the depth value corresponding to the tracking information.

Additionally, the processor renders a left and right binary viewpoint video if the type is a personalized display, and multiple viewpoint videos if the type is a general-purpose display.

According to the device and method according to an embodiment of the present disclosure, there is an effect of enhancing the user's immersion in a stereoscopic video by allowing the user to feel a three-dimensional effect in an object at a desired location and feeling a three-dimensional effect in response to an object moving back and front.

DETAILED DESCRIPTION

Figure 1:
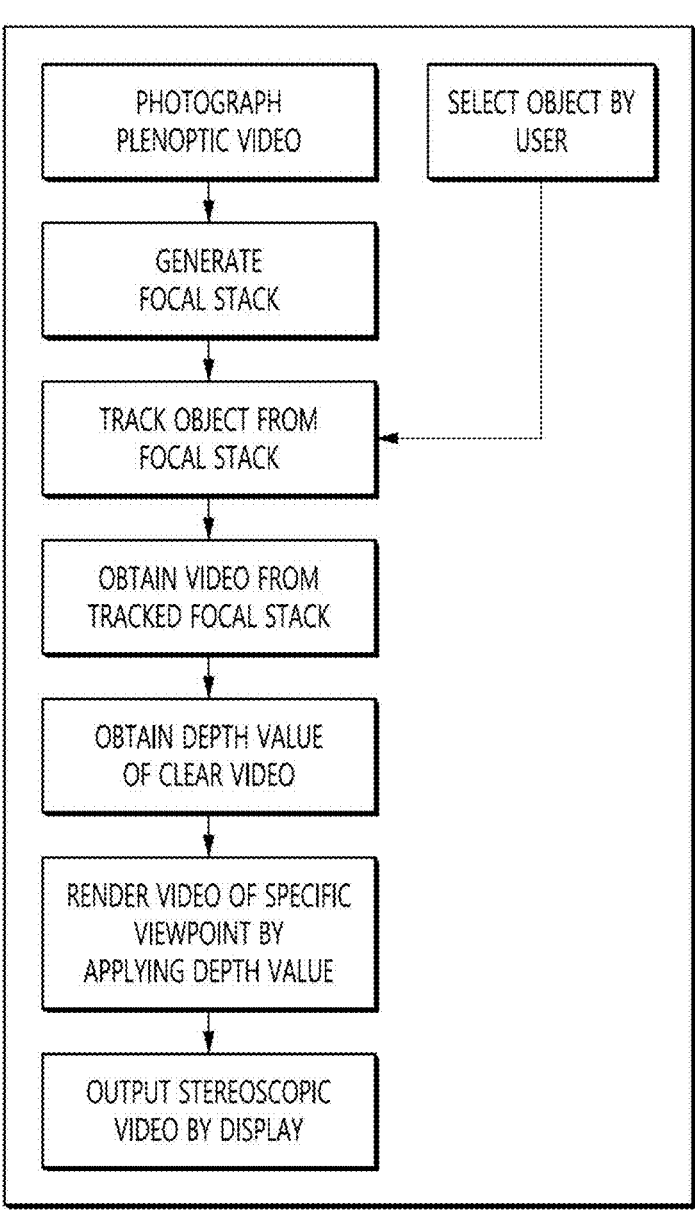
FIG. 1 is a block diagram illustrating an operation of a stereoscopic video generating apparatus according to an embodiment of the present invention.

Hereinafter, embodiments will be described in detail with reference to the accompanying drawings. However, the scope of the patent is not limited or limited by these embodiments. The same reference numerals presented in each drawing denote the same members.

Various changes may be applied to the embodiments described below. The embodiments described below are not intended to be limited to embodiments, and should be understood as including all changes, equivalents or substitutes thereto.

Terms such as first or second may be used to describe various components, but these terms should be understood only for the purpose of distinguishing one component from another component. For example, a first component may be referred to as a second component, and similarly, a second component may also be referred to as a first component.

The terms used in configurations are used only to describe specific configurations and are not intended to limit configurations. Singular expressions include plural expressions unless the context clearly indicates otherwise. In the present specification, terms such as "including" or "to have" are intended to designate the existence of features, numbers, steps, operations, components, parts, or combinations thereof described in the specification, and should be understood not to preclude the existence or addition of one or more other features or numbers, steps, operations, components, parts, or combinations thereof.

Unless otherwise defined, all terms used herein, including technical or scientific terms, have the same meaning as is generally understood by those of ordinary skill in the art to which the embodiment belongs. Terms such as those defined in commonly used dictionaries should be interpreted as having meaning consistent with the meaning of the context of the relevant technology and are not interpreted in an ideal or overly formal sense unless explicitly defined in this application.

In addition, in the description with reference to the accompanying drawings, the same components regardless of the reference numerals are assigned with the same reference numerals, and overlapping descriptions thereof are omitted. In describing the embodiment, if it is determined that a detailed description of the related known technology may unnecessarily obscure the gist of the embodiment, the detailed description thereof is omitted.

The present disclosure provides a stereoscopic video generating device and operation method for automatically focusing on an object of interest of immersive content.

According to the operation of the stereoscopic video generating device according to an embodiment of the present disclosure, the user may experience an object of interest in immersive content with a higher three-dimensional effect or clarity.

To this end, the stereoscopic video generating device may obtain the plenoptic video data and identify an object of interest desired by the user. The identity operation of the object of interest may be performed according to a user's designation.

Thereafter, the stereoscopic video generating device may perform object tracking in video data of multiple viewpoints based on the designated object. The result information generated according to object tracking may include a depth value corresponding to the object. The stereoscopic video generating device may perform object rendering at a time point desired by the user based on the depth value.

Object rendering may be performed differently depending on the type of display. For example, in the case of a personalized display, a left and right binary viewpoint video may be created, and in the case of a general-purpose display, a multiple viewpoint video may be created for muxing.

Conventional technology needed to create a good three-dimensional effect at a location designated by the manufacturer in order to feel a three-dimensional effect, but according to the operation of the stereoscopic video generating device according to an embodiment of the present disclosure, a higher three-dimensional effect can be experienced in an object at a location desired by the user. In addition, the stereoscopic video generating device according to an embodiment of the present disclosure can provide a high three-dimensional effect to the user by specifying the object in motion even when the object moves (e.g., moving forward and backward).

Hereinafter, an embodiment of the present invention will be described in detail with reference to the accompanying drawings.

FIG. 1 is a block diagram illustrating an operation of a stereoscopic video generating apparatus according to an embodiment of the present invention.

Referring to FIG. 1, the stereoscopic video generating device may automatically focus on an object desired by a user and output it to the stereoscopic video display.

First, the stereoscopic video generating device may obtain video data of multiple viewpoints from a plenoptic camera.

Video data of multiple viewpoints in which the plenoptic camera is obtain may be referred to as a plenoptic video.

Compared to conventional video processing technology that relies on 2D (dimensional) camera video information, plenoptic (plenoptic) videos can be understood as videos that provide information on light traveling in any direction in space.

That is, for each pixel constituting a 2D (dimensional) video, it may be suitable for realistic description of objects in real space because it provides light intensity and color information about the sampled direction.

In addition, the plenoptic video information has the spatial domain information of the existing 2D (dimensional) video and the angular domain information based on the directional information. Using the depth information of the spatial area and the additional direction information of the ray by the angle area, video processing such as perspective viewing change, refocusing, and 3D (dimensional) depth information extraction can be performed.

Since the plenoptic video contains additional optical information, it is possible to acquire the depth value and at the same time, it is possible to generate optically accurate refocus. Unlike structured light cameras, it also enables depth information processing in an outdoor environment.

Thereafter, the stereoscopic video generating device may obtain the object information of interest. Specifically, the object information of interest may mean information on an object desired by a user. For example, it may be information on the location, state, size, etc. of an object desired to be tracked by a user.

The object information of interest may be automatically identified by the stereoscopic video generating device according to a preset criterion or may be extracted from a user's input.

If the object information of interest is obtained, as a follow-up procedure, the stereoscopic video generating device may apply an object tracking algorithm to the obtained video data. Using the refocus technology of plenoptic, the local stack may be configured for each video frame of the video. Each local stack video may have a different part that is well focused depending on the depth.

If the tracking algorithm is applied to each local stack video, tracking may succeed only in the local stack video in which the object desired by the user clearly appears, and may fail in the rest of the local stack video.

If the depth value corresponding to the local stack that appears clearly through tracking is found, the depth information as well as the location of the object desired by the user may be retained. In this case, a deep learning-based siam or transformer-based latest tracking algorithm may be applied.

By applying object tracking to each frame, in each frame, how the user wants the object to move, location information and depth information can be maintained.

In addition, the stereoscopic video generating device may generate a specific viewpoint video by applying the plenoptic technology. In this case, the input main parameter may be a value corresponding to a location where the user looks at and to what depth the object the user wants is in.

In the case of a personalized display, information on which position the user looks at is provided in the display, and in the case of a general-purpose display, the position may be determined according to the characteristics of the display. In order to find out to what extent the object desired by the user is in depth, the depth value information of the tracking result derived according to the above-described operation may be used.

Figure 2:
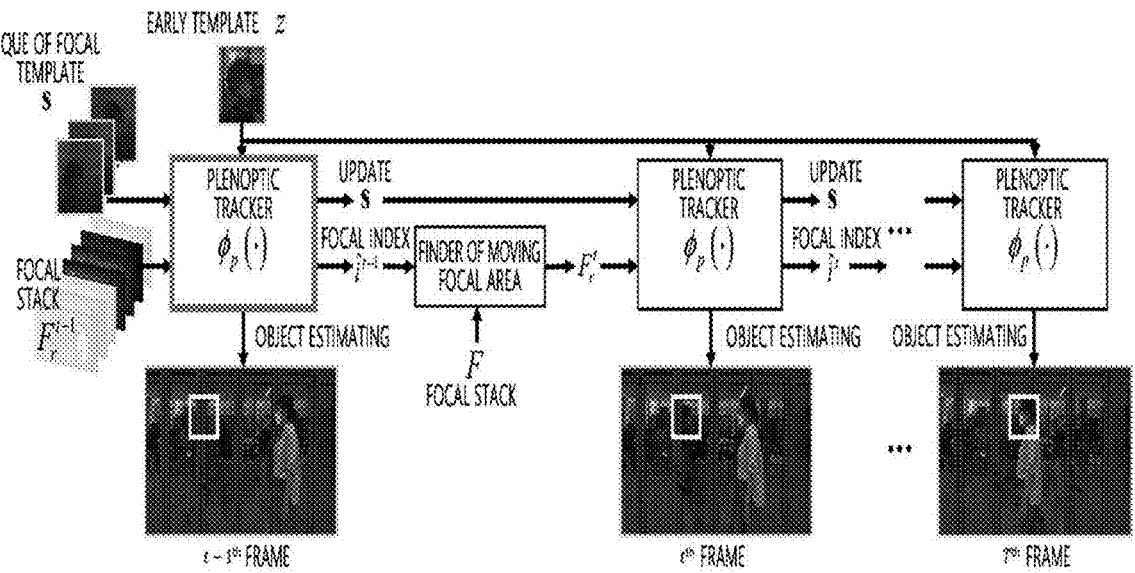
FIG. 2 is a schematic diagram of a local stack generation and object tracking operation performed by a stereoscopic video generation device according to an embodiment of the present disclosure.

FIG. 2 is a schematic diagram of a local stack generation and object tracking operation performed by a stereoscopic video generation device according to an embodiment of the present disclosure.

After generating the initial local stack, the stereoscopic video generating device may perform object tracking based on the object information desired by the user. Specifically, by applying the initial template indicating the object to the tracker as an input, tracking may be performed on all local videos within the predetermined local stack. In this case, a video having the highest confidence may be selected from the local video in which tracking is successful. In this case, the identified video may be identified as a final tracking video corresponding to the corresponding frame.

In the next frame, instead of using the entire local stack, the number of local stacks specified by the user before and after the final tracking video in the previous frame may be configured and used for tracking. This may be referred to as a dynamic local area explorer. Tracking is successful among the number of local videos designated by the user, and a video having a high confidence may be designated as the final tracking video of the frame. Thereafter, the frame may proceed in the same manner.

Figure 3:
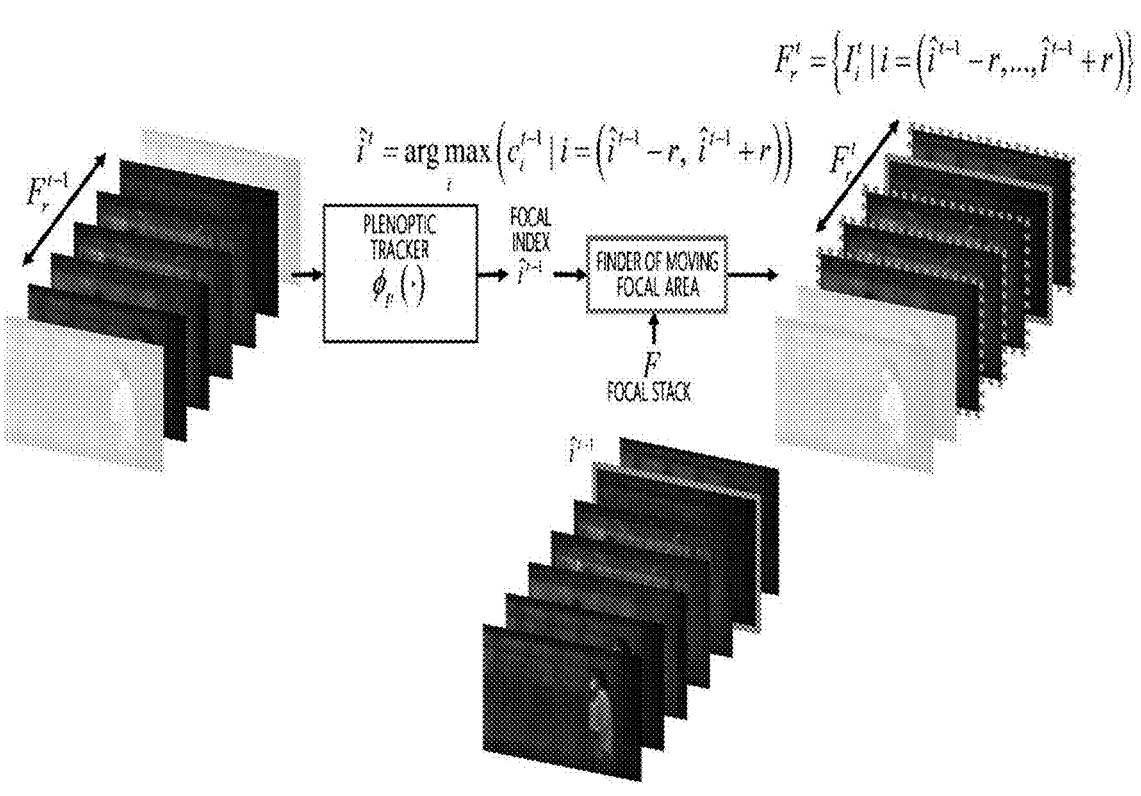
FIG. 3 is a schematic diagram of a dynamic focal region searcher applied to a stereoscopic video generating device according to an embodiment of the present disclosure.

FIG. 3 is a diagram illustrating a dynamic focal area searcher applied to a stereoscopic video generating device according to an embodiment of the present disclosure.

As described above in the description of FIG. 2, the dynamic local area searcher of the stereoscopic video generating device identifies the local point corresponding to the local video of the previous frame and configures the local stack back and forth by any number (e.g., r) specified by the user based on the local index.

Specifically, the local index may be determined based on the following Equation 1.

$$\hat{i}' = \arg\max_{i}\left(c_i^{t-1} \mid i = \left(\hat{i}^{t-1} - r, \hat{i}^{t-1} + r\right)\right) \qquad \text{[Equation 1]}$$

Here, t corresponds to a frame order, c corresponds to confidence, and r may correspond to an arbitrary number designated by the user.

In addition, the local stack may be determined based on Equation 2 below.

$$F_r^t = \left\{I_i^t \mid i = \left(\hat{i}^{t-1} - r, \ldots, \hat{i}^{t-1} + r\right)\right\} \qquad \text{[Equation 2]}$$

Figure 4:
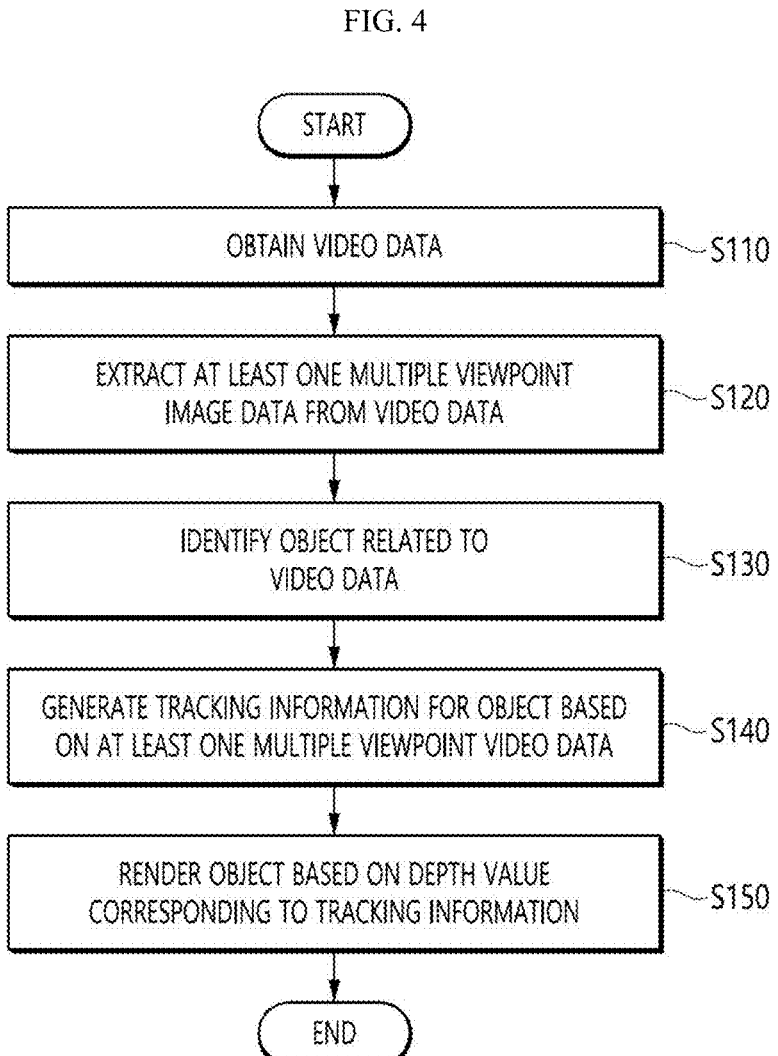
FIG. 4 is a flowchart illustrating an operation of a stereoscopic video generating apparatus according to an embodiment of the present invention.

FIG. 4 is a flowchart illustrating an operation of a stereoscopic video generating apparatus according to an embodiment of the present invention.

The stereoscopic video generating device according to an embodiment of the present disclosure may perform an automatic focusing operation on an object of interest in immersive content according to the following steps.

In step S110, the stereoscopic video generating device obtains video data.

Here, the video data includes plenoptic video data including color information for a plurality of views.

In step S120, the stereoscopic video generating device extracts at least one multiple viewpoint video data from the video data.

In addition, the stereoscopic video generating device can generate a local stack corresponding to each frame of video data using PLENOPTIC's refocus technology and extract at least one multiple viewpoint video data based on the local stack.

Here, at least one multiple viewpoint video data may correspond to at least one local video included in the local stack extracted from the plenoptic video.

In step S130, the stereoscopic video generating device identifies an object associated with video data.

In addition, the stereoscopic video generating device may obtain designated object information according to the user's selection.

In step S140, the stereoscopic video generating device generates tracking information for an object based on at least one multiple viewpoint video data.

In addition, the stereoscopic video generating device can apply a predetermined tracking algorithm to at least one multiple viewpoint video data to identify multiple viewpoint videos in which objects appear clearly among at least one multiple viewpoint video data.

In step S150, the stereoscopic video generating device performs rendering on the object based on the depth value corresponding to the tracking information.

In addition, the stereoscopic video generating device may identify the type of display in which the object is output and select a rendering method for the object based on the type.

Additionally, the stereoscopic video generating device can render left and right binary viewpoint videos if the type is a personalized display, and multiple viewpoint videos if the type is a general-purpose display.

Figure 5:
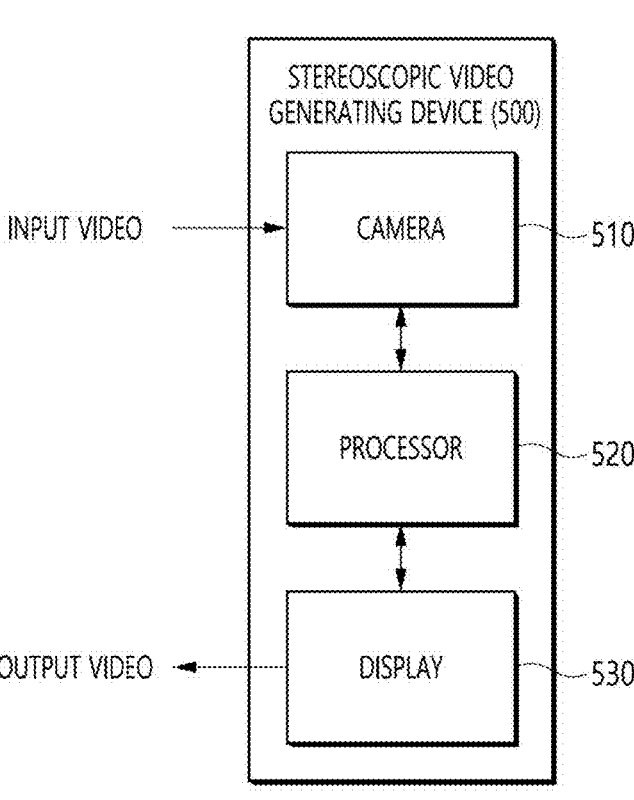
FIG. 5 is a block diagram showing the configuration of a stereoscopic video generating device according to an embodiment of the present invention.

FIG. 5 is a block diagram showing the configuration of a stereoscopic video generating device according to an embodiment of the present invention.

As shown in FIG. 5, a stereoscopic video generating device 500 may include a camera 510, a processor 520, and a display 530.

The camera 510 may receive an input video from the outside. For example, the camera 510 may obtain video data. For example, the camera 510 may obtain video from the outside. For example, the camera 510 may obtain a plenoptic video. For example, the camera 510 may obtain plenoptic video data including color information for a plurality of views.

The camera 510 may transmit the obtained input video to the processor 520.

The processor 520 may obtain video data. The processor 520 may extract at least one multiple viewpoint video data from the obtain video data.

The processor 520 may identify an object associated with video data. The processor 520 may generate tracking information for an object based on at least one multiple viewpoint video data. The processor 520 may generate an output video by rendering the object based on a depth value corresponding to the tracking information.

The processor 520 may generate a local stack corresponding to each frame of the video data using the refocus technology of the plenoptic, and extract the at least one multiple viewpoint video data based on the local stack.

The processor 520 may apply a predetermined tracking algorithm to the at least one multiple viewpoint video data to identify a multiple viewpoint video in which the object is clearly displayed among the at least one multiple viewpoint video data, and generate tracking information for the object based on at least one multiple viewpoint video data.

Here, at least one multiple viewpoint video data may correspond to at least one local video included in a local stack extracted from plenoptic video data.

The display 530 may output an output video rendered under the control of the processor 520. For example, the output video may be a multiple viewpoint video, a binary viewpoint video, or a multiple viewpoint video rendered through the processor 520.

Although the present specification includes details of a number of specific implementations, they should not be understood as limiting to any invention or claimable scope—but rather as descriptions of features that may be specific to a particular embodiment of the particular invention. In the context of individual embodiments, specific features described herein may be implemented in combination in a single embodiment. Conversely, the various features described in the context of a single embodiment may also be implemented individually or in any suitable sub-combination in multiple embodiments. Furthermore, although the features operate in a particular combination and may be initially described as such, one or more features from the claimed combination may in some cases be excluded from the combination, and the claimed combination may be changed to a sub-combination or a variant of the sub-combination.

On the other hand, the embodiments of the present invention disclosed in the present specification and the drawings are merely examples for better understanding and are not intended to limit the scope of the present invention. It is obvious to those skilled in the art that other modifications based on the technical idea of the present invention may be implemented in addition to the embodiments disclosed herein.

What is claimed is:

1. A method of generating a stereoscopic video of a stereoscopic video generating device, the method comprising:

obtaining video data;

extracting at least one multiple viewpoint video data from the obtained video data;

identifying an object associated with the obtained video data;

generating tracking information for the object based on the at least one multiple viewpoint video data;

rendering the object based on a depth value corresponding to the tracking information, generating a local stack corresponding to each frame of the video data by implementing a plenoptic refocus technology, extracting at least one multiple viewpoint video data based on the generated local stack, and applying a predetermined tracking algorithm to the at least one multiple viewpoint video data to identify multiple viewpoint videos in which the object is clearly displayed among the at least one multiple viewpoint video data.

2. The method of claim 1, wherein the video data includes plenoptic video data including color information for a plurality of views.

3. The method of claim 1, wherein the at least one multiple viewpoint video data corresponds to at least one local video included in a local stack extracted from a plenoptic video.

4. The method of claim 1, further comprising:

obtaining designated object information according to a user's selection.

5. The method of claim 1, comprising:

identifying the type of display from which the object is output; and selecting a rendering method for the object based on the type.

6. The method of claim 5, comprising:

when the type of display is a personalized display, rendering a left binary viewpoint video and a right binary viewpoint video, and when the type of display is a general-purpose display, rendering a multiple viewpoint video.

7. A stereoscopic video generating apparatus, comprising:

a camera configured to receive video data;

a processor configured to generate output videos using the video data; and a display configured to display the output videos, wherein the processor is further configured to:

receive the video data, extract at least one multiple viewpoint video data from the received video data, identify the object associated with the received video data, generate tracking information for the object based on the at least one multiple viewpoint video data, and generate the output video by rendering the object based on a depth value corresponding to the tracking information, wherein the processor is further configured to:

generate a local stack corresponding to each frame of the video data by implementing a plenoptic refocus technology, extract at least one multiple viewpoint video data based on the generated local stack, and apply a predetermined tracking algorithm to the at least one multiple viewpoint video data to identify multiple viewpoint videos in which the object is clearly displayed among the at least one multiple viewpoint video data.

8. The apparatus of claim 7, wherein the video data includes plenoptic video data including color information for multiple viewpoints.

9. The apparatus of claim 7, wherein the at least one multiple viewpoint video data corresponds to at least one local video included in a local stack extracted from a plenoptic video.

10. The apparatus of claim 7, wherein the processor is further configured to receive designated object information according to a user's selection.

11. The apparatus of claim 7, wherein the processor identifies the type of display from which the object is output; and selects a rendering method for the object based on the type.

12. The apparatus of claim 11, wherein when the type of display is a personalized display, the processor is further configured to render a left binary viewpoint video and a right binary viewpoint video, and when the type of display is a general-purpose display, the processor is further configured to render a multiple viewpoint video.

* * * * *